April 27, 1954 W. V. SMITH 2,677,051
SPECTRUM LINE DISCRIMINATOR
AND FREQUENCY STABILIZER
Filed June 9, 1947
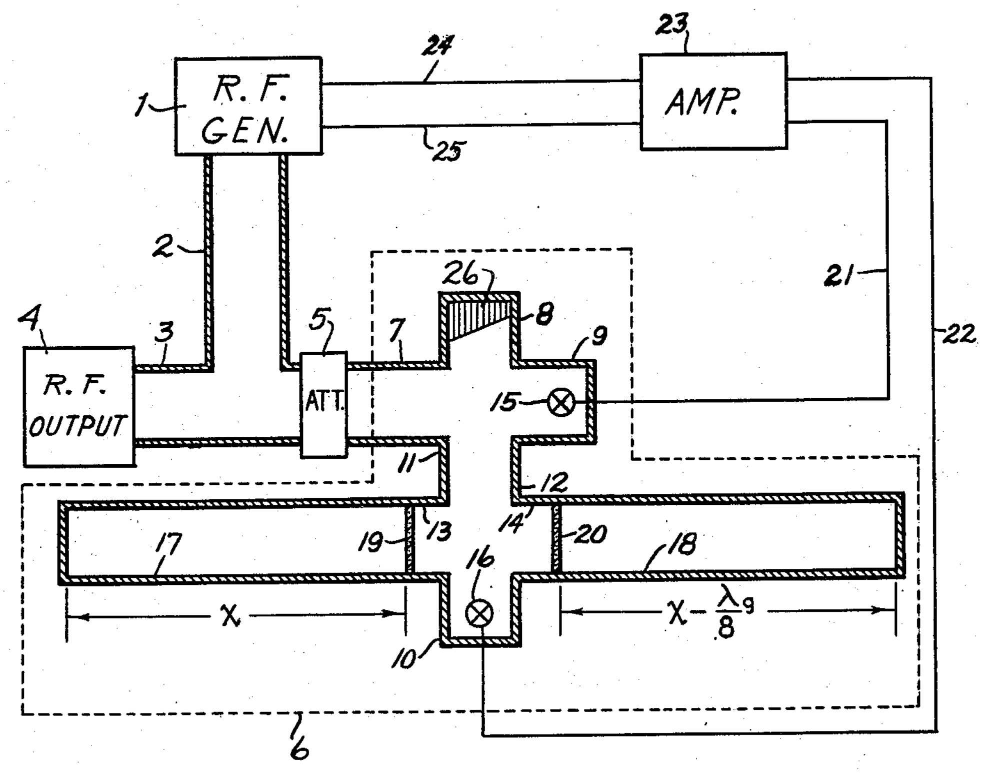
Inventor
WILLIAM V. SMITH
By Elizabeth Newton Dew
Attorney Patented Apr. 27, 1954

2,677,051

UNITED STATES PATENT OFFICE 2,677,051

SPECTRUM LINE DISCRIMINATOR AND FREQUENCY STABILIZER

William V. Smith, Durham, N. C., assignor to Research Corporation, New York, N. Y., a corporation of New York Application June 9, 1947, Serial No. 753,479

2 Claims. (Cl. 250—21)

This invention relates to high frequency oscillators and, more particularly, to means for effectively controlling and regulating the frequency of such oscillators.

While there are numerous requirements in laboratory and commercial oscillators such as wave form, output voltage and frequency stability, the latter requirement is of greatest importance for high frequency oscillators because of the large shifts in frequency produced by small deviations in operating conditions. Many high frequency oscillators are provided with an electrode of a nature such that varying the voltage applied thereto correspondingly varies the frequency of the tube oscillations. In most such oscillators, the variation of frequency with applied voltage is substantially linear over the effective frequency range. If a portion of the power output of such oscillators is fed to a discriminator producing an output voltage which is substantially a linear function of the input frequency, the discriminator output varies as the change in frequency of the oscillator. By feeding the discriminator output to the oscillator electrode in proper phase, the frequency may be maintained substantially constant because any change in frequency causes a voltage output in the discriminator which, in turn, effects a compensating frequency change in the oscillator such as will restore the frequency to the desired value.

Discriminators designed for use with very high frequency or hyperfrequency oscillators customarily employ cavity resonators for the frequency determining element of the discriminator. The resonant frequency of such a cavity, in general, varies with the temperature and a great deal of inventive effort has been directed toward temperature compensation of this type of resonator. A further difficulty is that at very high frequencies it becomes difficult to design a cavity discriminator whose output voltage per unit change in frequency is sufficiently great to provide a close control of the oscillator frequency.

It is accordingly an object of the present invention to provide a frequency determining circuit element whose response to changes in input frequency is sufficiently great to provide a corresponding voltage change which, when applied to an electrode of the oscillator, will maintain the output of the same very close to some fixed reference frequency.

Another object is to provide a frequency determining circuit element which will be substantially independent of changes in ambient temperature.

A further object is to provide a frequency-determining circuit element substantially independent of changes in oscillation power.

A still further object is to provide a frequency responsive circuit element employing a resonant absorption of a gas, known as a spectrum line, in controlling the frequency of an oscillator at some predetermined standard or reference frequency.

Other objects and advantages of the invention will become apparent after a study of the following disclosure.

Referring in detail to the single figure of the drawing which shows one form of the invention, 1 identifies an R. F. generator of conventional type feeding high frequency oscillations to a tee, or equivalent device 2 which divides the energy, one portion of which is conducted by section 3 to an output device 4 such as a directional transmitting antenna.

The remaining portion of the energy from oscillator 1, generally less than fifty per cent of the generator output, feeds through an attenuator 5 into the spectrum line discriminator of my invention, comprising those parts within the dotted line 6.

This discriminator comprises two "magic tees" having electrically symmetrical pairs of arms as shown, so that if any pair is terminated by matched loads, an R. F. signal incident on the tee through one of the arms of the remaining pair divides equally between the first pair, that is, the pair terminated by matched loads. Under such condition no signal appears in the remaining, or fourth arm of the tee. From the above description, it is evident that a "magic tee" is the microwave equivalent of a four terminal pair "hybrid coil" having identical characteristic admittance at all four terminal pairs.

In the particulator embodiment shown, the signal is incident in arm 7 of the first tee. Arm 8 is terminated by a matched load and arms 9 of the first tee and 10 of the second tee by crystal detectors 15 and 16, respectively, which are adjusted in a well known manner to present matched loads to the R. F. signal. Arm 11 of the first tee is connected to and feeds into arm 12 of the second tee.

The remaining pair of arms 13 and 14 are terminated by two secions of wave guide 17 and 18 of electrical lengths "$x$" and "$x-\lambda_g/8$" where $\lambda_g$ is the wavelength of the electromagnetic radiation in the arms. As shown, sections 17 and 18 are connected to the arms 13 and 14, respectively, at symmetrical points or planes. In the species shown, these points or planes are defined by electrically transparent windows or partitions 19 and 20 which may be of mica and which seal each section into an air tight compartment which enables the compartments to be evacuated and filled with a gas at low pressure having an absorption line at a known frequency. The aforesaid pressure is generally less than 0.1 mm of Hg, at which pressure, resonant absorptions in the gas, alternatively, known as spectrum lines, are very sharp, with half widths of as little as, or less than, one megacycle.

The detectors 15 and 16 are coupled by leads 21 and 22 to an amplifier 23, which, in turn is connected to generator 1 by leads 24 and 25 so that the output voltage of amplifier 23 controls the frequency of the oscillations of the generator.

In operation an R. F. signal incident in arm 7 divides equally between arms 8 and 11. That part of the signal incident in arm 8 is absorbed in the matched termination 26 and plays no part in the operation. The signal incident in arm 11 of the first tee continues through arm 12 of the second tee and divides equally between arms 13 and 14 of the second tee. The signals in arms 13 and 14 are then reflected by short circuit terminations of the arms and recombine at the tee junction, one portion being incident on crystal 16 and rectified thereby while the other portion re-enters arm 11 of the first tee where half enters arm 7 and is sufficiently absorbed in the attenuator 5 to play no further part in the operation. The remaining half of the reflected signal in arm 11 enters arm 9 and is there detected by crystal 15.

Since the absorption and dielectric constant of the gas in section 17 is dependent upon the frequency in the vicinity of its resonant absorption, the rectified signals from crystals 15 and 16 are correspondingly frequency sensitive. It can be shown that with a particular selection of electrical lengths for sections 17 and 18, the sum of the rectified output of crystals 15 and 16 eliminates or cancels all but the frequency-dependent portion of the output signal. This frequency-dependent portion is a substantially linear function of input frequency near the resonant frequency $\nu_0$ of the section 18 and is amplified at 23 and the output voltage applied to the frequency-determining or frequency-varying electrode of generator 1 in such phase as to correct any tendency of the generator to drift from the frequency of maximum absorption of the gas.

In the species of the invention shown, sections 17 and 18 were made approximately two meters long. $NH_3$ gas was used which has an absorption line known as 3, 3 at 23,870 megacycles. By using a pressure such that the half line width was about 1 megacycle, a discriminator curve was obtained whose slope at the maximum frequency of the line was 70 millivolts per megacycle.

This discriminator characteristic was then fed into the reflector electrode of a 2K50 oscillator, used as the R. F. generator. Stabilization was checked by varying a potentiometer control on the reflector electrode in such a direction as to tend to increase the output frequency. The oscillator tuned continuously up to 23,841 megacycles, then jumped to the line frequency of 23,870 megacycles and remained constant within one megacycle until it again jumped to 23,892 megacycles. Control was thus maintained for variations in reflector voltage equivalent to a frequency spread of just under 51 megacycles.

The measured variation of potentiometer voltage over which the frequency remained constant, was 14 volts of a total reflector-cathode voltage of 75 volts. By varying the pressure of the gas, the stabilization could be made to appear and disappear at will. Because of the fact that the arms expand equally with changes in temperature, the instrument is substantially independent of changes in ambient temperature.

While two windows 19 and 20 are shown in the species illustrated, if window 20 is reflectionless and section 17 is filled with air, window 19 may be omitted. The wave guide sections 17 and 18 must be long enough so that appreciable absorption takes place at $\nu_0$, but not so long that the incident wave is completely absorbed at $\nu_0$ since, in the latter case, complete absorption may also occur at frequencies in the immediate vicinity of $\nu_0$, that is, complete absorption of incident energy. In particular it should be noted that the difference $\lambda_g/8$ is measured in electrical length which may differ from physical length where the dielectric constant is different in the two wave guide sections.

In the claims, the term "spectrum line discriminator" is to be interpreted as a structure containing a gas with a resonant absorption, the frequency and sharpness of which determine the frequency response of the discriminator.

While I have shown a preferred form of the invention as now known to me, various substitutions of equivalents will occur to those skilled in the art after a study of the foregoing description. Hence the disclosure should be taken in an illustrative rather than a limiting sense and it is my desire and intention to reserve all such modifications as fall within the scope of the subjoined claims. It should be noted that other gases than ammonia may be used in my discriminator, as examples, I may list BrCN and ICN, both of which have strong absorptions in the 20,000 to 30,000 megacycle regions, and also at higher frequencies.

Having now fully disclosed the invention what I claim and desire to secure by Letters Patent is:

1. In a spectrum line discriminator for stabilizing the output frequency of a high frequency generator, a T-junction comprising first and second opposed transmission line sections, said first section having an electrical length "$x$" and said second section having an electrical length $x-\lambda_g/8$, where $\lambda_g$ is the desired stabilized wavelength of the electromagnetic radiation of said generator, said sections being air tight and filled with a gas having a resonant absorption, of said radiation at said stabilized frequency.

2. In a device of the type described, first and second T-junctions each said T-junction comprising first and second pairs of arms, said first pair of arms of said first T-junction being electrically symmetrical and terminating in short circuits differing in electrical length by substantially an eighth wavelength of the output of a source of high frequency radiation, at least one of said first pair of arms containing a gas at a pressure having resonant absorption at a predetermined frequency, first detector means terminating one arm of the second pair of said first T-junction, second detector means terminating one arm of the first pair of said second T-junction, the other arm of said first pair being adapted for connection with said source, a matched termination at the end of one of the second pair of arms of said second T-junction, each of said T-junctions having their second arms of said second pairs in common.

References Cited in the file of this patent

UNITED STATES PATENTS

| Number | Name | Date |
|---|---|---|
| 2,124,029 | Conklin | June 19, 1938 |
| 2,312,079 | Crosby | Feb. 23, 1943 |
| 2,455,895 | Tyrrell | July 27, 1948 |

OTHER REFERENCES

"Electromagnetic waves of 1.1 cm. Wave-Length and the Absorption Spectrum of Ammonia," by Cleeton and Williams, published by Physical Review for February 15, 1934, pages 234 to 237.

"Ammonia Absorption Measurements with Guided Waves and the Shape of a Spectrol Line," Ph.D. Thesis submitted by H. S. Howe to the University of Michigan in 1940, pages 29 to 56.

The Absorption of Microwaves, by Gases-Hershberger Journal of Applied Physics, vol 17, June, 1946, pages 495–500.